Jan. 9, 1968  W. M. POSINGIES  3,362,233
CONTROL APPARATUS
Filed July 7, 1965  3 Sheets-Sheet 1

INVENTOR.
WALTER M. POSINGIES
BY *Ronald T. Reiling*
ATTORNEY

Jan. 9, 1968    W. M. POSINGIES    3,362,233
CONTROL APPARATUS

Filed July 7, 1965    3 Sheets-Sheet 2

(a) YAW NULL PITCH NULL
(b) YAW NULL MEDIUM PITCH UP
(c) YAW NULL FULL PITCH UP

INVENTOR.
WALTER M. POSINGIES
BY Ronald T. Reiling
ATTORNEY

Jan. 9, 1968   W. M. POSINGIES   3,362,233
CONTROL APPARATUS

Filed July 7, 1965   3 Sheets-Sheet 3

INVENTOR.
WALTER M. POSINGIES
BY Ronald T. Reiling

ATTORNEY

United States Patent Office 3,362,233
Patented Jan. 9, 1968

3,362,233
CONTROL APPARATUS
Walter M. Posingies, Minneapolis, Minn., assignor to Honeywell Inc., Minneapolis, Minn., a corporation of Delaware
Filed July 7, 1965, Ser. No. 470,164
7 Claims. (Cl. 74—5.6)

This invention pertains to a signal generator, and more particularly to a fluid signal generator providing a pulse duration modulated output signal.

The applicant's fluid signal generator may be utilized to provide either single axis information or two axes information. An output signal of duration modulated pulses indicative of the displacement of a member relative to an axis is provided. The utilization of a pulse duration modulated output signal provides increased accuracy, improved null shift characteristics, and more precise gain control than is available with the prior art analog type fluid signal generators. A typical prior art analog type fluid signal generator is illustrated in U.S. Patent 2,821,-859, S. R. Crockett, issued Feb. 4, 1958. As illustrated in the Crocket patent, the magnitude of the pressure sensed by the pressure probes is proportional to the displacement of the gyro rotor relative to the gyro housing. This proportional (analog) signal is then conveyed to a pressure differential device such as a piston slideable in a cylinder to provide a useable signal. The applicant's unique fluid signal generator, however, provides a signal which is modulated on a time basis so as to overcome the inherent disadvantages of an analog type output signal.

The applicant's invention has particular application to a gyroscope and will be explained with reference thereto, however, it should be understood that the applicant's invention is not limited to utilization in a gyroscope. In one particular embodiment, the applicant's fluid signal generator utilizes the spin rate of a gyro rotor to provide a clock frequency. The gyro rotor is hydrostatically supported within a housing by a fluid for displacement relative to three intersecting axes. The fluid exhausting through the hydrostatic bearing means provides a fluid flow between the rotor and the bearing means. Restrictor means located on the rotor define a first zone and a second zone between the rotor and the bearing means.

A plurality of sensing ports are provided in the bearing means. The restrictor means in conjunction with the flow of fluid through the sensing ports is effective to cause a first fluid characteristic (pressure or fluid flow) in the first zone and a second fluid characteristic in the second zone. The rotation of the rotor about the spin axis causes relative movement between the restrictor means and the sensing ports whereby each of the sensing ports is alternatively in communication with the first zone and the second zone so as to sense the fluid characteristic thereof and provide an output of fluid pulses. The displacement of the rotor relative to the second of the three axes being effective to vary the time one of the sensing ports is in communication with the first zone and the second zone so as to vary the duration of the pulses therein. The duration of the pulses is indicative of the displacement of the rotor relative to the second of the three axes. The pulses may be amplified by a fluid amplifier. Another of the sensing ports operates in a similar manner to a pulse duration modulated output signal indicative of the displacement of the rotor relative to the third of the three axes.

The scope of the invention will become apparent from a study of the accompanying specification and claims in conjunction with the drawings in which:

Figure 1:
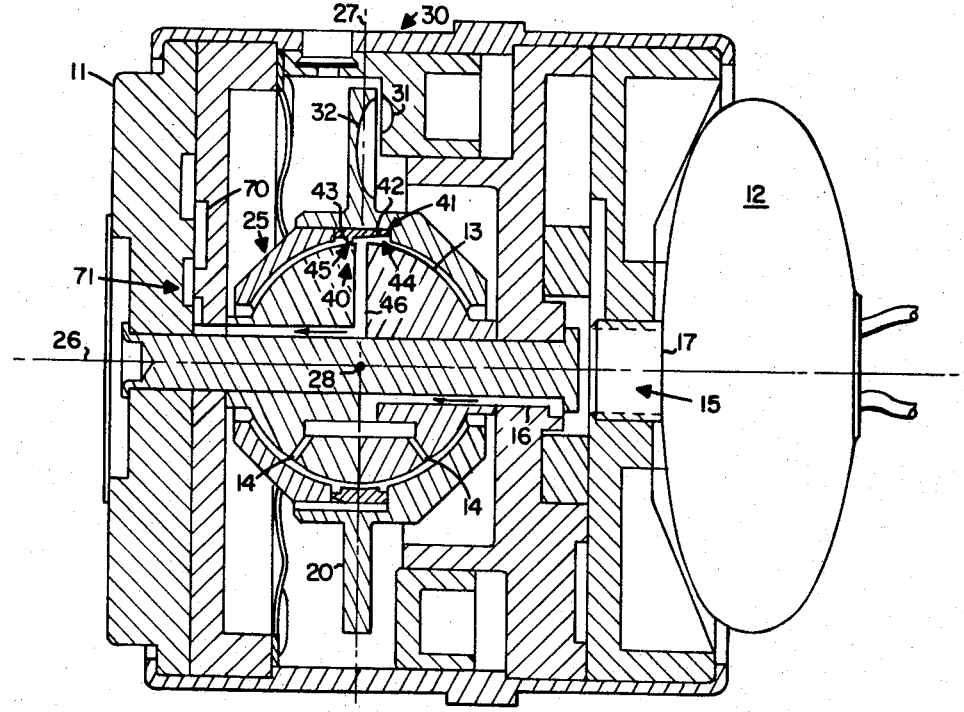
FIGURE 1 is a cross-sectional view of a gyroscope utilizing the applicant's unique fluid signal generator.

Referring now to FIGURE 1, reference numeral 10 generally depicts a gimballess, free rotor gyroscope. The gyroscope includes a housing means 11 having a source of high pressure fluid 12 integral therewith. The source of high pressure fluid may be either a cold or a hot gas generator. Of course, the source of fluid may be remote from the gyroscope 10. Housing 11 has a hydrostatic bearing element 13 rigidly attached thereto. Hydrostatic bearing element 13 has a plurality of bearing orifices 14 located therein. Means 15 are provided for connecting the plurality of bearing orifices 14 to the source of high pressure fluid 12. Means 15 include a discharge element 16 which releases the fluid from source 12, conduit 17, and manifold 18.

A rotor element 20 surrounds bearing element 13 and is spaced apart therefrom. Fluid source 12 and bearing orifices 14 cooperate to form a hydrostatic bearing means 25 that supports rotor 20 for rotation about three intersecting axes, such as 26, 27, and 28. The fluid flowing through hydrostatic bearing means 25 from source 12 provides a fluid flow between rotor 20 and bearing element 13.

Means 30 are provided for driving rotor 20 about axis 26 at a substantially constant angular velocity. Means 30 in the particular embodiment illustrated in FIGURE 1 includes a spin-up nozzle 31, which is supplied with fluid from source 12 through suitable conduit means (not shown) and turbine buckets on rotor 20. Fluid exhausting from spin-up nozzle 31 impinges upon turbine buckets 32 of rotor 20 causing rotor 20 to rotate about axis 26 at a substantially constant angular velocity.

Figure 3:
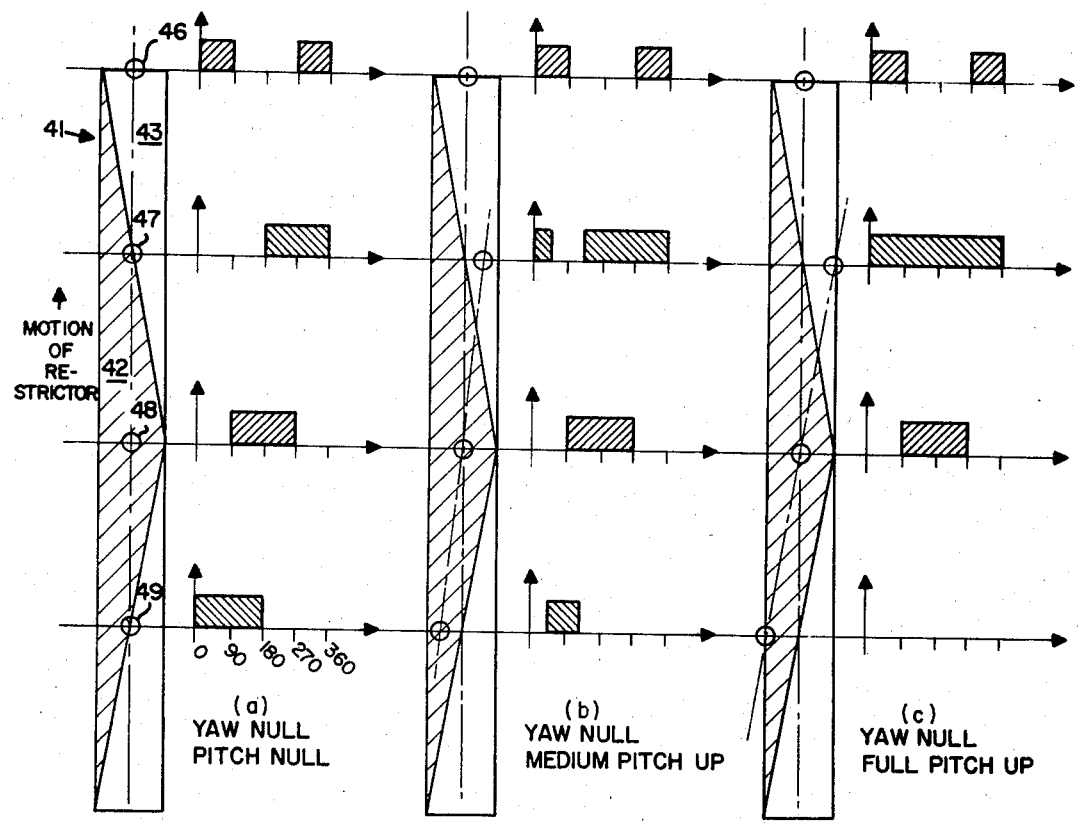
FIGURE 3 is a schematic representation of the output signals of the fluid signal generator at various orientations of the gyro rotor.

A fluid signal generator 40 is provided which includes restrictor means 41 located on the inner periphery of rotor 20. In the particular embodiment illustrated in FIGURE 1, restrictor means 41 includes a recessed area 42 and a raised area 43. The geometric configuration of restrictor means 41 is best illustrated in FIGURE 3 where the restrictor means is unrolled and illustrated in a plan view. Recessed area 42 is triangular in shape in this particular embodiment. It should be understood, that various geometric combinations of recessed areas 42 and raised areas 43 may be utilized and the applicant does not want to be limited to the particular geometric configuration illustrated in FIGURES 1 and 3. Recessed area 42 of restrictor means 41 defines a zone 44 between the inner periphery of rotor 20 and bearing element 13. Raised area 43 of restrictor means 11 defines a zone 45 between the inner periphery of rotor 20 and bearing element 13. Fluid signal generator 40 also includes two pairs of sensing ports 46, 47, 48, and 49, in bearing element 13. Sensing ports 46 through 49 are equally angularly spaced about axis 26, in the embodiment illustrated in FIGURES 1 and 3. The position of sensing ports 46 through 49 with reference to restrictor means 41 is best illustrated in FIGURE 3. The applicant does not wish to be limited to the particular location and relative position of the sensing ports illustrated in FIGURES 1 and 3. Only a single sensing port is necessary for providing information for each axis. For a two axis pickoff, the minimum number of sensing ports is two.

A pair of bistable fluid amplifiers are provided, one of which is illustrated in FIGURE 1 and is identified by reference numeral 70. Means 71 are provided for connecting sensing ports 46 and 48 to the control passages of amplifier 70. If the signal appearing in the sensing ports is of sufficient magnitude, no amplification is necessary and the fluid amplifiers need not be utilized. In that case, the signal in the sensing ports is the output signal of the fluid signal generator.

The operation of gyro 10 is initiated by activating means 15 which direct high pressure fluid from source 12 to hydrostatic bearing means 25 and to means 30 for driving rotor 20. Hydrostatic bearing means 25 supports rotor 20 for rotation about three intersecting axes 26, 27, and 28. Means 30 drives rotor 20 about axis 26 at a substantially constant angular velocity. The fluid flowing from source 12 through orifices 14 of hydrostatic bearing means 25 provides a fluid flow between the inner periphery of rotor 20 and bearing element 13. A portion of the fluid exhausting through orifices 14 of hydrostatic bearing means 25 flows to sensing ports 46, 47, 48, and 49 and exhausts restrictor means 41 in conjunction with the flow of fluid through the sensing ports is effective to cause a first fluid characteristic in zone 44 and a second fluid characteristic in zone 45. More specifically, the radial clearance between restrictor means 41 and bearing element 13 controls the fluid characteristics appearing in zones 44 and 45. When raised area 43 covers a sensing port, such as 46, restrictor means 41 provides a greater restriction to the flow of fluid through port 46 than when recessed area 42 covers port 46. Let X equal the radial clearance between restrictor means 41 and the sensing ports and let D equal the diameter of the sensing ports. When $\pi DX$ is much less than $\pi D^2/4$, restrictor means 41 acts as a flow limiting device. That is, there is very little pressure fluctuation in the sensing ports, but the fluid flow through the sensing ports varies when recessed area 42 covers the sensing ports the fluid flow therethrough is different from the fluid flow therethrough when the raised area 43 covers the sensing ports. When $\pi DX$ is much greater than $\pi D^2/4$, the fluid flow through the sensing ports is substantially constant but the pressure therein varies. When recessed area 42 covers the sensing ports, the pressure therein is different from the pressure therein when raised area 43 covers the sensing ports. Thus the fluid characteristics in zones 44 and 45, that are sensed by the sensing ports, may be either a variation in pressure or a variation in flow.

With reference to FIGURES 1 and 3, it is clear that each of the sensing ports 46 through 49 is alternatively in communication with zone 44 and zone 45. The sensing ports sense the fluid characteristic of zones 44 and 45, that is, a change in pressure or a change in flow between the two zones.

Let axis 27 correspond to the yaw axis of a vehicle and axis 28 correspond to the pitch axis of a vehicle. When rotor 20 is at a normal or null position with respect to axes 27 and 28, each sensing port senses the fluid characteristics of zone 44 and zone 45 for an equal time duration or periods. This is illustrated by the graph in FIGURE 3(a) which shows sensing ports 46, 47, 48, and 49 each sensing the fluid characteristics of zone 44 (port covered by recessed area 42) for 180 degrees of rotation of rotor 20 and sensing the fluid characteristics of zone 45 (port covered by raised area 43) for 180 degrees of rotation of rotor 20. Each sensing port provides an output of constant duration pulses. When rotor 20 is rotated about axis 28 (a medium pitch up of the vehicle) sensing ports 47 and 49 alternatively sense the fluid characteristic of zones 44 and 45 for different durations or time periods and provide an output of duration modulated pulses. This is evident from FIGURE 3(b). Note that sensing ports 46 and 48 still alternatively sense the fluid characteristics of zones 44 and 45 for equal time durations indicating no rotation of rotor 20 about axis 27 (yaw null). The output from each of sensing ports 46–49 is conveyed to a fluid amplifier for amplification thereof (if necessary). The duration of the pulses in sensing ports 47 and 49 is indicative of the amount of rotation of rotor 20 about axis 28. As mentioned previously, only a single pressure sensing port such as 47 is necessary to obtain an output signal having a pulse duration modulated output signal which is indicative of the amount of rotation of rotor 20 about axis 28. When rotor 20 is rotated further about axis 28 (full pitch up) the signal illustrated in FIGURE 3(c) is obtained. Again it is clear that the duration of the pulse in the sensing ports is varied as a function of the amount of rotation of rotor 20 from its normal or null position.

Figure 2:
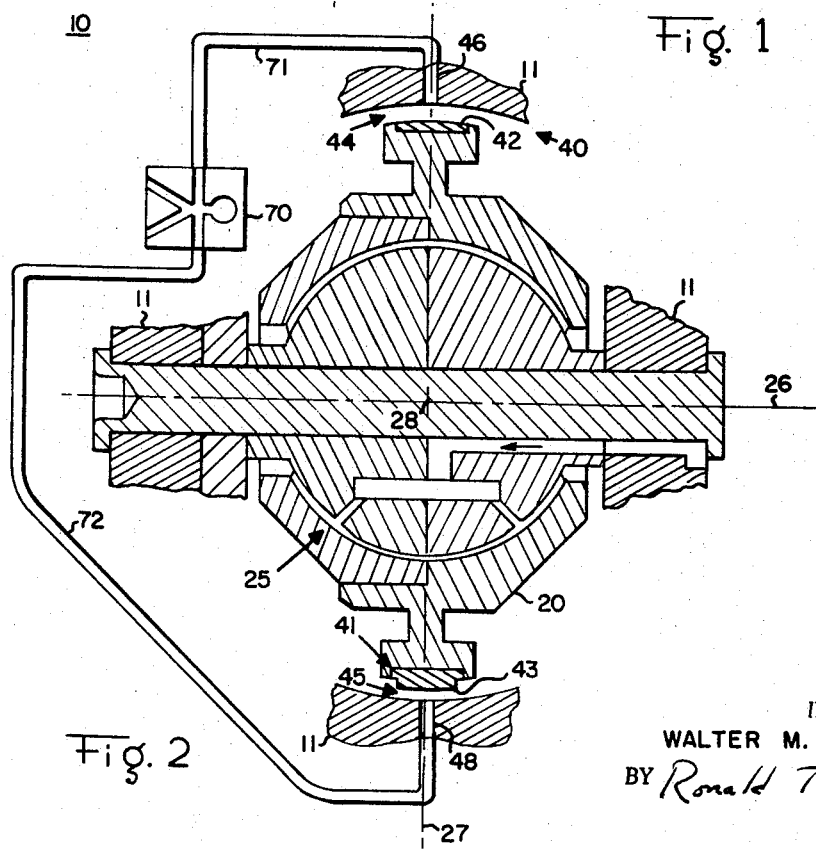
FIGURE 2 is an enlarged partial cross-sectional view of an alternate embodiment of the applicant's fluid signal generator.

An alternate embodiment of the applicant's invention is illustrated in FIGURE 2. The fluid signal generator illustrated in FIGURE 2 is essentially an inside-out version of the signal generator illustrated in FIGURE 1. Consequently, identical reference numerals will be utilized to identify similar components.

A rotor element 20 is supported within a housing 11 for rotation about three intersecting axes 26, 27, and 28 by a hydrostatic bearing means 25. Means are provided (not shown) to rotate rotor 20 about axis 26 at a substantially constant angular velocity. Signal generator means 40 are provided including a restrictor means 41. Restrictor means 41 has a recessed area 42 and a raised area 43 thereon. Signal generator 40 also includes two pair of sensing ports, two of which, 46 and 48, are illustrated in FIGURE 2. Sensing port 46 is connected to the control passage of a fluid amplifier 70 by means of conduit 71. Sensing port 48 is connected to the other control passage of fluid amplifier 70 by means of conduit 72.

A portion of the fluid exhausting through hydrostatic bearing means 45 provides a fluid flow between rotor 20 and housing means 11 which exhausts through the sensing ports. It should be understood, that rotor 20 need not be hydrostatically supported; other support means may be utilized. In that case, an independent fluid source would be utilized to provide the fluid flow between rotor 20 and housing 11. Recessed area 42 of restrictor means 41 defines a zone 44 between the outer periphery of rotor 20 and housing 11. The raised area 43 of restrictor means 41 defines a zone 45 between the outer periphery of rotor 20 and housing means 11. Restrictor means 41 in conjunction with the fluid flow through the sensing ports is effective to cause a first fluid characteristic in zone 44 and a second fluid characteristic in zone 45. The operation of the signal generator illustrated in FIGURE 2 is the same as the operation of the signal generator explained with reference to FIGURE 1. Consequently, the operation of the embodiment illustrated in FIGURE 2 need not be described in detail.

Figure 4:
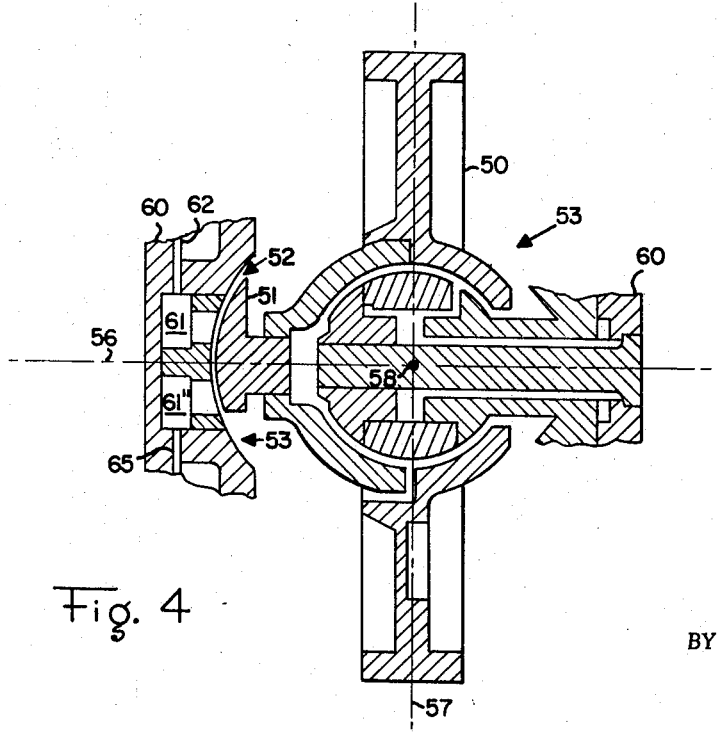
FIGURE 4 is an enlarged cross-sectional view of another alternate embodiment of the applicant's fluid signal generator.
Figure 5:
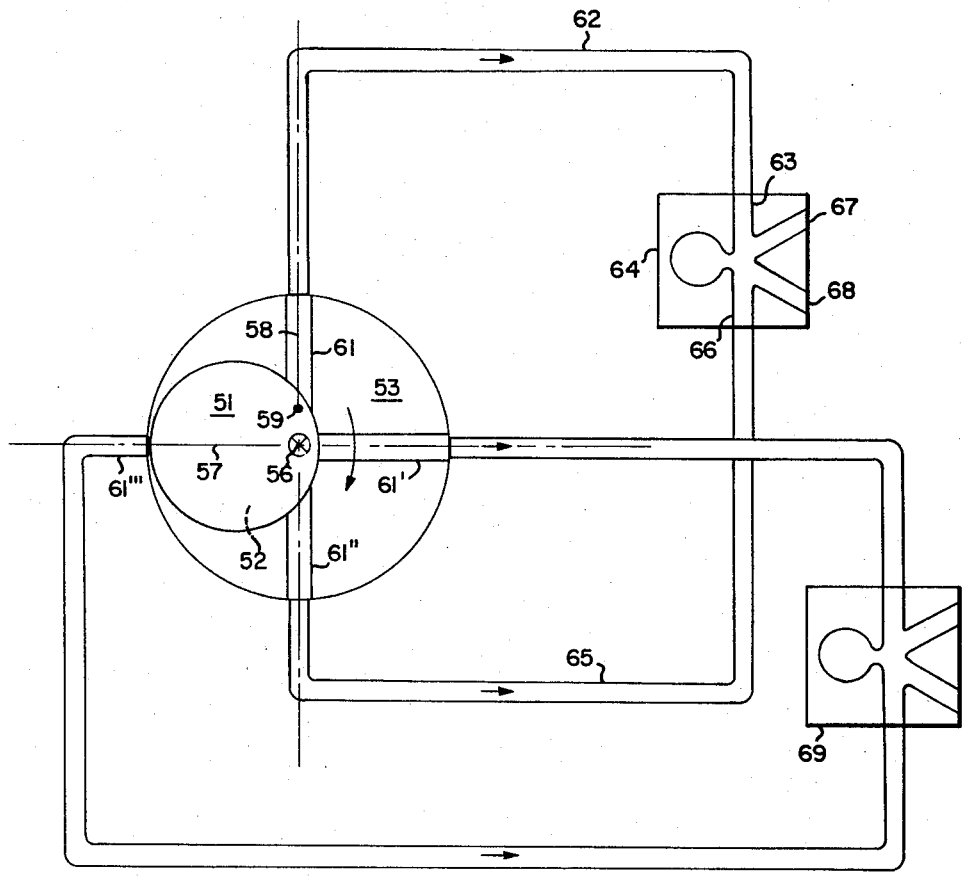
FIGURE 5 is a schematic representation of the embodiment illustrated in FIGURE 4.

Another embodiment of the applicant's invention is illustrated in FIGURE 4 which is an enlarged partial cross-sectional view of a rotor 50 supported by a hydrostatic bearing means 55 for rotation about three intersecting axes 56, 57, 58 relative to a housing means 60. Means (not shown) are provided to drive rotor 50 about axis 56 at a substantially constant angular velocity. Restrictor means 51 is located on rotor 50 for rotation therewith about axis 56. Restrictor means 51 has a circular cross section and is eccentrically mounted with respect to axis 56 (see FIGURE 5).

Although only a partial cross-sectional view is illustrated in FIGURE 4, it will be understood that housing means 60 completely encloses rotor 50. The fluid flowing through hydrostatic bearing means 55 exhausts from housing means 60 through a plurality of sensing ports 61, 61', 61'' and 61'''. Restrictor means 51 defines a zone 52 and a zone 53 between rotor 20 and housing means 60.

Restrictor means 51 in conjunction with the flow of fluid through the sensing ports is effective to cause a first fluid characteristic (fluid flow or pressure) in zone 52 and a second fluid characteristic in zone 53. The rotation of rotor 50 about axis 56 causes restrictor means 51 to cover each sensing port once during each revolution so that each sensing port is alternatively in communication with zone 52 and zone 53. Thus, the sensing ports alternatively sense the fluid characteristics of zones 52 and 53 and provide an output of fluid pulses. A conduit 62 connects sensing port 61 to control port 63 of a fluid amplifier 64. A conduit 65 connects sensing port 61" to the other control port 66 of fluid amplifier 64. The output passages of amplifier 64 are identified by reference numerals 67 and 68. Sensing ports 61' and 61'" are connected to the control ports of another fluid amplifier 69 by suitable conduits. It is not necessary to utilize the fluid amplifiers in all applications; the output pulses can be used directly without amplification if so desired. Only a single sensing port is necessary to determine the displacement of rotor 50 relative to axis 57. A single sensing port will also provide an output signal indicative of the displacement of rotor 50 relative to axis 58.

Figure 6:
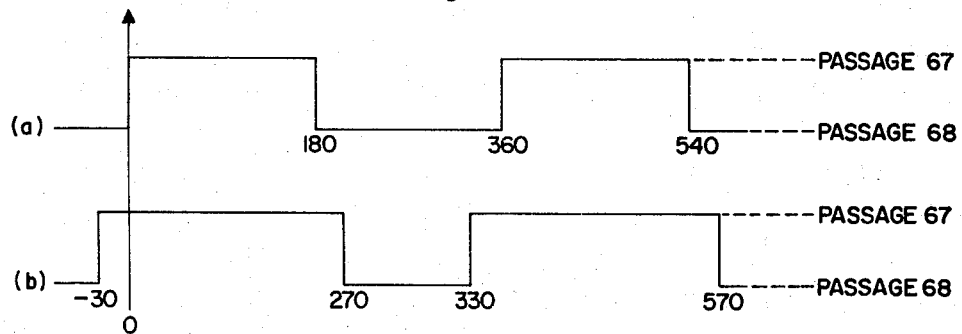
FIGURE 6 is a schematic representation of the output signal of the embodiment illustrated in FIGURES 4 and 5.

The output signals in output passages 67 and 68 of fluid amplifier 64 are illustrated in FIGURE 6. FIGURE 6(a) illustrates the output signal when rotor 50 is at the normal or null condition, that is, with the center of rotation of restrictor means 51 (axis 56) at the point of intersection of axes 57 and 58. Sensing port 61 alternatively senses the fluid characteristics of zones 52 and 53 and provides an output of fluid pulses of equal duration. This results in equal duration pulses from amplifier 64 (see FIGURE 6(a)). When rotor 50 is displaced from the null position, for example about axis 57, the center of rotation of restrictor means 51 is displaced from the intersection of axes 57 and 58, to a point such as point 59 in FIGURE 5. The time sensing port 61 is covered by cover means 51 is increased which results in a longer duration pulse in output passage 67. Pressure sensing port 61" is covered for a shorter time which results in a shorter duration pulse in passage 68 (see FIGURE 6(b)). Thus any displacement of rotor 50 from a null position will vary the time the sensing ports are covered by restrictor means 51. The duration of the pulses is indicative of the displacement of rotor 50 relative to axis 57 or to axis 58.

Thus, the applicant has provided a unique fluid signal generator which provides a pulse duration modulated output signal indicative of the displacement of the rotatable element relative to an axis.

While I have shown and described the specific embodiments of this invention, further modification and improvements will occur to those skilled in the art. I desire it to be understood, therefore, that this invention is not limited to the particular form shown and I intend in the appended claims to cover all modifications which do not depart from the scope of this invention.

What is claimed is:

1. A gyroscope comprising:
housing means;
a source of high pressure fluid integral with said housing means;
hydrostatic bearing means;
means connecting said hydrostatic bearing means to said source of high pressure fluid;
a rotor hydrostatically supported by said hydrostatic bearing means for rotation about three intersecting axes, said rotor having a normal position relative to the three axes, the fluid exhausting from said hydrostatic bearing means provides a fluid flow between said rotor and said bearing means;
means for driving said rotor about one of the three axes at a substantially constant angular velocity;
a fluid signal generator including restrictor means located on said rotor defining a first zone between said rotor and said bearing means and a second zone between said rotor and said bearing means, said signal generator further including two pairs of sensing ports in said bearing means, said restrictor means in conjunction with the flow of fluid through said sensing ports being effective to cause a first fluid characteristic in said first zone and a second fluid characteristic in said second zone, the rotation of said rotor about said one of said three intersecting axes causing relative movement between said restrictor means and said sensing ports whereby each of said sensing ports is alternatively in communication with said first zone and said second zone so as to sense the fluid characteristic thereof and provide an output of fluid pulses, the rotation of said rotor about the second of said three intersecting axes being effective to vary the time the ports of one pair of sensing ports are in communication with said first zone and said second zone so as to vary the duration of the pulses therein, rotation of said rotor about the third of said three intersecting axes being effective to vary the time the ports of other pair of sensing ports are in communication with said first zone and said second zone so as to vary the duration of the pulses therein;
a pair of bistable fluid amplifiers integral with said housing means; and
means connecting each pair of sensing ports to the control ports of one of said pair of fluid amplifiers, whereby one of said pair of fluid amplifiers provides a pulse duration modulated output signal indicative of the rotation of said rotor about the second of the three intersecting axes relative to the normal position of said rotor, and the other pair of said two pair of fluid amplifiers provides a pulse duration modulated output signal indicative of the rotation of said rotor about the third of the three intersecting axes relative to the normal position of said rotor.

2. A gyroscope comprising:
housing means;
a source of high pressure fluid integral with said housing means;
hydrostatic bearing means;
means connecting said hydrostatic bearing means to said source of high pressure fluid;
a rotor hydrostatically supported by said hydrostatic bearing means for rotation about three intersecting axes, said rotor having a normal position relative to the three axes, the fluid exhausting from said hydrostatic bearing means provides a fluid flow between said rotor and said bearing means;
means for driving said rotor about one of the three axes at a substantially constant angular velocity;
a fluid signal generator, including restrictor means located on said rotor defining a first zone between said rotor and said bearing means and a second zone between said rotor and said bearing means, said bearing means having a plurality of sensing ports therein angularly spaced about said one of the three axes, said restrictor means in conjunction with the flow of fluid through said sensing ports being effective to cause a first fluid flow in said first zone and a second fluid flow in said second zone, the rotation of said rotor about said one of said three intersecting axes causing relative movement between said restrictor means and said sensing ports whereby each of said sensing ports is alternatively in communication with said first zone and said second zone so as to sense the fluid flow thereof and provide an output of fluid pulses, the rotation of said rotor about the second of said three intersecting axes being effective to vary the time one of said sensing ports is in communication with said first zone and said second zone so as to vary the duration of the pulses therein, the duration of the pulses in said one port being indicative of the rotation of said rotor about the second of said three intersecting axes, rotation of said rotor abut the third of said three intersecting axes being effective to vary the time another of said sensing ports is in communication with said first zone and said second zone so as to vary the duration of the pulses therein, the duration of the pulses in said another port being indicative of the rotation of said rotor about the third of said three intersecting axes;

a pair of bistable fluid amplifiers integral with said housing means; and means connecting each pair of sensing ports to the control ports of one of said pair of fluid amplifiers, whereby one of said pair of fluid amplifiers provides a pulse duration modulated output signal indicative of the rotation of said rotor about the second of the three intersecting axes relative to the normal position of said rotor, and the other pair of said two pair of fluid amplifiers provides a pulse duration modulated output signal indicative of the rotation of said rotor about the third of the three intersecting axes relative to the normal position of said rotor.

3. A gyroscope comprising:

housing means;

a source of high pressure fluid integral with said housing means;

hydrostatic bearing means;

means connecting said hydrostatic bearing means to said source of high pressure fluid;

a rotor hydrostatically supported by said hydrostatic bearing means for rotation about three axes, the fluid exhausting from said hydrostatic bearing means provides a fluid flow between said rotor and said bearing means;

means for driving said rotor about one of the three axes at a substantially constant angular velocity; and a fluid signal generator including a restrictor means located on said rotor defining a first zone between said rotor and said bearing means, and a second zone between said rotor and said bearing means, said signal generator further including a plurality of sensing ports in said bearing means, said restrictor means in conjunction with the flow of fluid through said sensing ports being effective to cause a first fluid pressure in said first zone and a second fluid pressure in said second zone, the rotation of said rotor about said one of said three axes causing relative movement between said restrictor means and said sensing ports whereby each of said sensing ports is alternatively in communicaton with said first zone and said second zone so as to sense the fluid pressure thereof and provide an output of fluid pulses, the rotation of said rotor about the second of said three axes being effective to vary the time one of said sensing ports is in communication with said first zone and said second zone so as to vary the duration of the pulses therein, the duration of the pulses in said one port being indicative of the rotation of said rotor about the second of said three axes, rotation of said rotor about the third of said three axes being effective to vary the time another of said sensing ports is in communication with said first zone and said second zone so as to vary the duration of the pulses therein, the duration of the pulses in said another port being indicative of the rotation of said rotor about the third of said three axes.

4. A sensitive instrument comprising:

housing means;

hydrostatic bearing means;

means for connecting said hydrostatic bearing means to a source of high pressure fluid;

a rotor hydrostatically supported by said hydrostatic bearing means for displacement relative to two axes, the fluid exhausting from said hydrostatic bearing means provides a fluid flow between said rotor and said bearing means;

means for rotating said rotor about one of said two axes at a substantially constant angular velocity;

a fluid signal generator including restrictor means located on said rotor defining a first zone between said rotor and said bearing means, and a second zone between said rotor and said bearing means, said signal generator further including sensing means in said bearing means, said restrictor means in conjunction with the flow of fluid through said sensing means being effective to cause a first fluid characteristic in said first zone and a second fluid characteristic in said second zone the rotation of said rotor about said one of said two axes causing relative movement between said restrictor means and said sensing means whereby said sensing means is alternatively in communication with said first zone and said second zone so as to sense the fluid characteristic thereof and provide an output of fluid pulses, the rotation of said rotor about the other of said two axes being effective to vary the time the sensing means are in communication with said first zone and said second zone so as to vary the duration of the pulses therein, the duration of the pulses being indicative of displacent of said rotor relative to said other axis;

a bistable fluid amplifier; and means connecting said sensing means to said fluid amplifier, said fluid amplifier providing a pulse duration modulated output signal indicative of the displacement of said rotor relative to the other of said two axes.

5. A sensitive instrument comprising:

housing element;

a rotor element supported within said housing for displacement relative to two axes;

means for providing a fluid flow between said rotor and said housing;

means for rotating said rotor about one of said two axes at a substantially constant angular velocity; and a fluid signal generator including restrictor means located on one of said elements defining a first zone between said rotor and said housing and a second zone between said rotor and said housing, said signal generator further including sensing means in the other of said elements, said restrictor means in conjunction with the flow of fluid through said sensing means being effective to cause a first fluid characteristic in said first zone and a second fluid characteristic in said second zone, the rotation of said rotor about said one of said two axes causing relative movement between said restrictor means and said sensing means whereby said sensing means is alternatively in communication with said first zone and said second zone so as to sense the fluid characteristic thereof and provide an output of fluid pulses, the displacement of said rotor relative to the other of said two axes being effective to vary the time said sensing means are in communication with said first zone and said second zone so as to vary the duration of the pulses therein, the duration of the pulses being indicative of the displacement of said rotor relative to the other of said two axes.

6. In an instrument of the class having housing means enclosing a rotor supported by a fluid for displacement relative to three axes, the supporting fluid providing a fluid flow between the housing means and the rotor, and means for driving the rotor at a substantially constant angular velocity about one of the three axes, the combination with fluid signal generator means including a restrictor means located on said rotor and defining a first zone between said rotor and said housing means and a second zone between said rotor and said housing means, said signal generator further including a plurality of sensing ports in said housing means, said restrictor means in conjunction with the flow of fluid through said sensing ports being effective to cause a first fluid characteristic in said first zone and a second fluid characteristic in said second zone, the rotation of said rotor about said one of said three axes causing relative movement between said restrictor means and said sensing ports whereby each of said sensing ports is alternatively in communication with said first zone and said second zone so as to sense the fluid characteristic thereof and provide an output of fluid pulses, the displacement of said rotor relative to the second of said three axes being effective to vary the time one of said sensing ports is in communication with said first zone and said second zone so as to vary the duration of the pulses therein, the duration of the pulses in said one sensing port being indicative of the displacement of said rotor relative to the second of said three axes, the displacement of said rotor relative to the third of said three axes being effective to vary the time another of said sensing ports is in communication with said first zone and said second zone so as to vary the duration of the pulses therein, the duration of the pulses being indicative of the displacement of said rotor relative to the third of said three axes.

7. In an instrument of the class having a housing element supporting a rotor element for displacement relative to two axes, means for providing fluid flow between the housing and the rotor, and means for driving the rotor at a substantially constant angular velocity about one of the two axes, the combination with a fluid signal generator including a restrictor means located on one of said elements defining a first zone between said rotor and said housing and a second zone between said rotor and said housing, said signal generator further including sensing means in the other of said elements, said restrictor means in conjunction with the flow of fluid through said sensing means being effective to cause a first fluid characteristic in said first zone and a second fluid characteristic in said second zone, the rotation of said rotor about said one of said two axes causing relative movement between said restrictor means and said sensing means whereby said sensing means is alternatively in communication with said first zone and said second zone so as to sense the fluid characteristic thereof and provide an output of fluid pulses, the displacement of said rotor relative to the other of said two axes being effective to vary the time said sensing means is in communication with said first zone and said second zone so as to vary the duration of the pulses therein, the duration of the pulses being indicative of the displacement of said rotor relative to the other of said two axes.

References Cited

UNITED STATES PATENTS

| 3,115,784 | 12/1963 | Parker | 74—5.7 X |
| 3,139,758 | 7/1964 | Lahde | 74—5.6 |
| 3,165,282 | 1/1965 | Noyes | 74—5.6 X |
| 3,187,588 | 6/1965 | Parker | 74—5.7 X |
| 3,254,538 | 6/1966 | Thomson | 74—5.7 |

FRED C. MATTERN, JR., *Primary Examiner.*

J. D. PUFFER, C. J. HUSAR, *Assistant Examiners.*